3,145,915
COMPRESSORS FOR FLUIDS

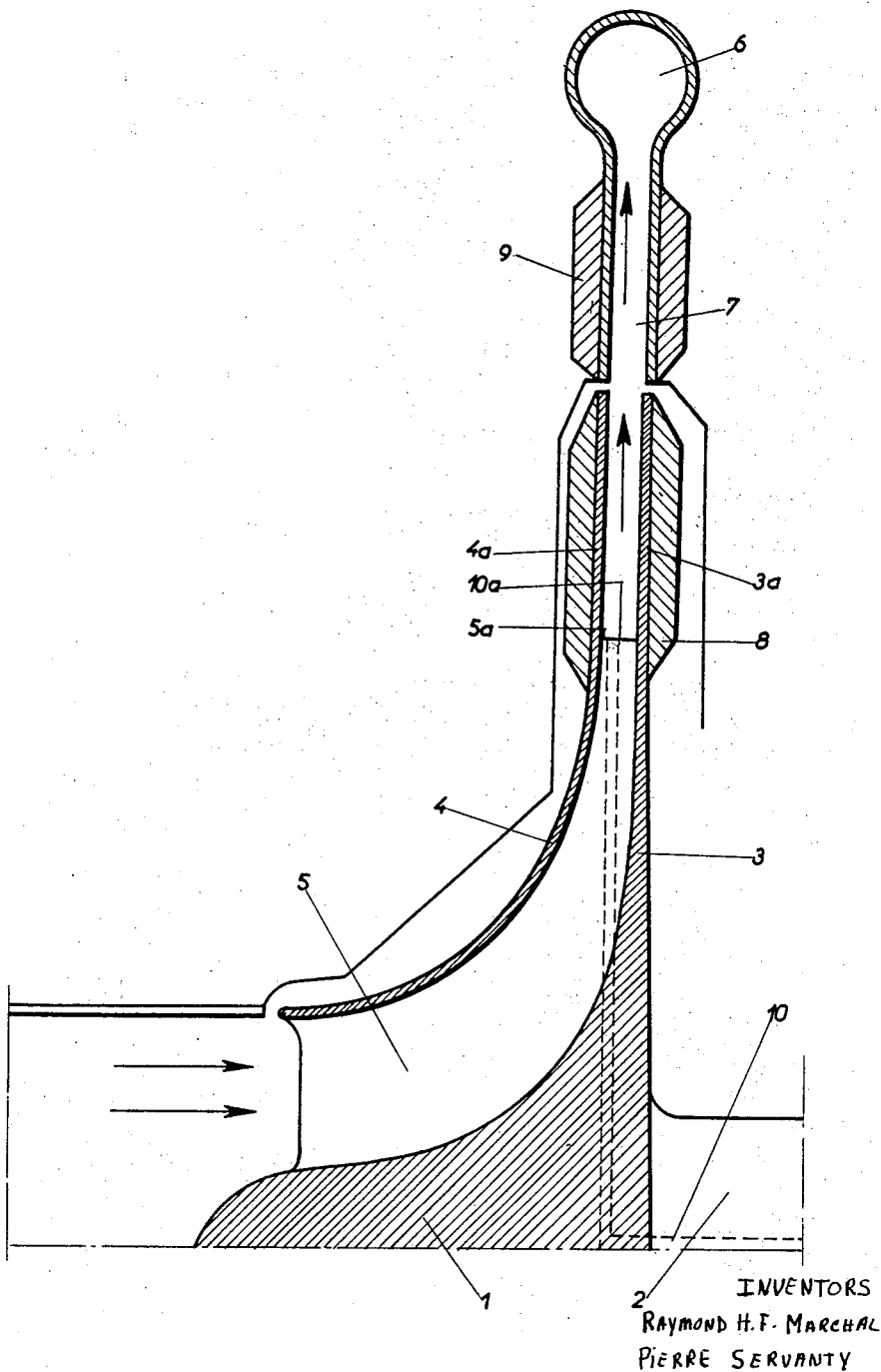

Raymond Hippolyte Firmin Marchal, Paris, and Pierre Servanty, Aulnay-sous-Bois, France, assignors to Société Nationale d'Etude et de Construction de Moteurs d'Aviation, Paris, France, a French company
Filed Nov. 17, 1960, Ser. No. 69,970
Claims priority, application France Nov. 20, 1959
2 Claims. (Cl. 230—209)

The present invention relates to compressors in which the fluid to be compressed is set in movement at high speed, and more precisely, at a speed which attains a substantial fraction of the local velocity of sound in the fluid to be compressed, or which exceeds that velocity.

The invention has for its object a method which consists in withdrawing heat from the fluid in movement in a compressor of the kind referred to, in a zone where the fluid has a high speed, in order to utilize the particular properties of high-speed flow in order to increase the compression ratio.

The invention is based on particular properties of fluids in flow.

It is known that in the straight-line flow of a perfect fluid, the stagnation pressure, which is the pressure which the fluid would possess if it were brought to rest in an iso-entropic path, that is to say by a reversible path without either receiving or losing heat, is affected by the thermo-dynamic process of the flow.

Thus, the stagnation pressure remains constant if the flow is iso-entropic. On the other hand, if the flow is subjected to exchanges of heat, the phenomena can be described in the following manner:

In the case where additional heat is applied to a flow of constant section, the static pressure, which is the pressure measured by an observer in movement with the fluid, decreases if the flow is subsonic and increases if the flow is supersonic, whereas the stagnation pressure decreases irrespective of the relation of the speed of flow to the local velocity of sound.

On the other hand, in the case where heat is abstracted from a flow of constant section, the static pressure increases if the flow is subsonic and decreases if the flow is supersonic, whereas the stagnation pressure increases irrespective of the relation of the speed of flow to the local velocity of sound.

The variation of the stagnation pressure may be represented by the expression:

(1) $$\frac{dp_a}{P_a} = \frac{-\gamma M^2}{2+(\gamma-1)M^2} \frac{dW}{DJC_pT}$$

in which:

$P_a$ = the stagnation pressure;
$\gamma$ = the ratio of the specific heats at a constant pressure and constant volume, of the fluid in motion;
$M$ = the Mach number of the speed of flow;
$D$ = the mass flow per unit area of surface;
$J$ = the mechanical equivalent of heat;
$C_p$ = the specific heat of the fluid at constant pressure;
$T$ = the temperature;
$W$ = the energy (positive if this is added to the flow).

The foregoing conditions assume, however, that the fluids are perfect, that is to say they have no viscosity and in consequence, are not subjected to the phenomena of friction. In fact, with real fluids, the increase in the stagnation pressure which would theoretically result from the abstraction of heat, may be more or less absorbed by the loss of pressure due to friction.

A semi-empirical relation, known by the name of "the Taylor-Reynolds analogy," establishes in fact that there exists for each fluid a determined relation between the coefficient of friction and the coefficient of heat-transfer between the fluid and the wall.

Within the field of validity of this relation, it appears that the quantity of heat which can be abstracted from the fluid through the wall will be insufficient, at all speeds of flow, to compensate for the loss of pressure due to the corresponding friction.

It can therefore be said that the increase in stagnation pressure which is theoretically possible by the abstraction of heat from the fluid having a high speed of flow can only be obtained in practice outside the field of validity of the Taylor-Reynolds analogy, or only within the scope of this analogy in the particular case where the friction adds energy to the fluid, such as for example at the periphery without blades of a centrifugal wheel.

Now, by abstracting heat in accordance with the invention in a high-speed zone of the fluid moving in a compressor of the type referred to above, the special properties of the flow are utilized, at the same time avoiding the limitations resulting from the Taylor-Reynolds analogy, so that an increase of the pressure ratio is effectively obtained.

This is due to the fact that there exists a considerable difference between the absolute speed of the fluid, which fixes the Mach number of the flow, and its speed with respect to the moving walls, which determines the friction.

In fact, when for example the case is studied of a centrifugal compressor in which the flow is usually supersonic at the outlet of the wheel, $V_r$ being the radial speed which is generally low, $\Omega$ the angular speed and $R$ the radius of the wheel, the absolute speed of the fluid at the outlet of the wheel is in the vicinity of:

$$V_1 \approx \sqrt{(0.9\Omega R)^2 + V_r^2}$$

whereas the relative speed with respect to the wheel is in the neighbourhood of:

$$V_2 \approx \sqrt{(0.1\Omega R)^2 + V_r^2}$$

It can be seen that if the radial speed $V_r$ is, for example, one-quarter of the linear speed $\Omega R$ of the wheel, the relative speed $V_2$ will be about 3.5 times smaller than the absolute speed $V_1$. The friction on the walls, being defined by the relative speed, will therefore be small, as will also be the quantity of heat which it will be possible to abstract from the flow through the walls. This energy will however be abstracted from a flow at a high absolute speed, that is to say having a high Mach number.

Equation 1 shows that since the absolute Mach number corresponding to $V_1$ is about 3.5 times greater than the relative Mach number corresponding to $V_2$, the variation of the stagnation pressure $$\frac{dp_a}{P_a}$$

will be considerably increased for the same energy $dW$ extracted from the fluid.

Thus, taking a relative Mach number $M_2$ equal to 0.5 and, in consequence, an absolute Mach number equal to 3.5 times 0.5, $\gamma$ being equal to 1.06 for example, assuming that $$\frac{dW}{DJC_pT}$$

is constant, the variation of the stagnation pressure $$\frac{dp_a}{P_a}$$

will be eleven times greater when the Mach number is defined by the absolute speed $V_1$ than when this Mach } number is defined by the relative speed $V_2$ with respect to the walls.

In the accompanying drawing, there has been shown by way of non-limitative example, one form of embodiment of the invention applied to a centrifugal compressor.

The single figure of the drawing is a view in axial cross-section of a part of a centrifugal compressor provided with an improvement in accordance with the invention.

There has been shown at 1 the compressor wheel, mounted on a shaft 2 and comprising two side-plates 3 and 4, and at 5 one of the blades of the wheel. In a centrifugal compressor having a supersonic rate of flow at the outlet of the wheel, the desire to avoid losses by impulse waves in the diffuser 6 often results in the provision of a fixed element 7 with parallel walls and without blades, preceding the usual diffuser 6, the flow being slowed down in the said fixed element to a subsonic speed.

In accordance with the invention, the side-plates of the wheel are extended at 3a and 4a beyond the extremities 5a of the blades 5. These side-plates 3a and 4a constitute the walls of a heat-exchanger 8, rigidly fixed to the wheel 1 and having the same angular speed as the wheel. The fluid which circulates inside the exchanger is at a lower temperature than the local temperature of the fluid to be compressed, so as to extract heat from this latter.

On the other hand, the flow in the element 7 which precedes the diffuser is subject to a high degree of friction, and in consequence lends itself to an intense thermal exchange. It is therefore advantageous for this portion of these side-plates which is nearest to the wheel 1 to constitute the wall of a fixed heat-exchanger 9. The fluid which circulates in this exchanger 9 is at a lower temperature than the local temperature of the fluid to be compressed so as to extract heat from this latter.

In addition, according to a particular form of the cooling system, which may or may not be combined with exchangers such as 8 and 9, a fluid which may or may not be compressed is injected in the liquid state and is vaporized in the zone to be cooled, thus extracting heat from the fluid to be compressed. This auxiliary fluid is introduced into a conduit 10 passing through the compressor shaft. This fluid, passing through each of the blades 5, is carried away at high speed by centrifugal force, and is vaporized as it is discharged through small nozzles 10a formed on the trailing edges of the blades. It should be observed that the vaporized jet discharged from the nozzles has practically the same speed as the fluid to be compressed, so that the speed of flow of this latter is not slowed down.

The vaporized fluid may furthermore be the same as the gas to be compressed. Thus, in the case of a particular application of the invention, the fluid to be compressed is uranium hexafluoride, and liquid uranium hexa-fluoride can be introduced into the conduit 10. As is well known, this substance can be liquified at pressures in the vicinity of atmospheric pressure and at temperatures of the order of 70° C.

It should be noted that the present improvement is clearly distinguished from known devices of compression by stages with intermediate cooling. In the latter, two stages of mechanical compression are separated by an exchanger with the object of bringing the work expanded as close as possible to the work of isothermal compression. The compression ratios are generally equal. In the improvement according to the present invention, the cooling is subsequent to the transmission of mechanical energy to the fluid to be compressed. Use is made of a property of fluid flow at high speed, taking advantage of the considerable difference between the relative speed and the absolute speed of the flow.

What is claimed is:

1. A centrifugal compressor of the transonic or supersonic type operating by means of a rotary bladed impeller and a stationary diffuser therearound, said compressor comprising two opposite annular disk extensions integral with said rotary bladed impeller and projecting radially outwardly therefrom downstream of the trailing edge of the blades thereof, to define a peripheral annular rotary passage extending radially intermediate said bladed impeller and said diffuser, and means fast with said rotary impeller for extracting calories from the fluid flow discharged by said blades on its way through said annular rotary passage toward said diffuser, said calories extracting means comprising injectors of vaporizable liquid opening into the peripheral annular rotary passage, whereby the latent heat of vaporization is applied to extract calories from the fluid flow through said passage, said liquid injectors being located on the trailing edge of the impeller blades.

2. Compressor as claimed in claim 1, wherein the vaporizable liquid and the fluid to be cooled are chemically identical.

References Cited in the file of this patent

UNITED STATES PATENTS

| | | |
|---|---|---|
| 390,508 | Mosher et al. | Oct. 2, 1888 |
| 1,764,535 | Simmon | June 17, 1930 |
| 2,364,279 | Dodge | Dec. 5, 1944 |
| 2,845,216 | Sallou | July 29, 1958 |
| 2,918,254 | Hausammann | Dec. 22, 1959 |
| 2,935,245 | McDonald | May 3, 1960 |

FOREIGN PATENTS

| | | |
|---|---|---|
| 342,727 | France | July 16, 1904 |
| 745,590 | France | Feb. 21, 1933 |
| 322,812 | Germany | July 9, 1920 |
| 475,711 | Germany | May 2, 1929 |
| 209,026 | Great Britain | Apr. 17, 1924 |